March 29, 1932.  E. J. W. RAGSDALE  1,851,211

AIRCRAFT STRUCTURE AND METHOD OF MAKING SAME

Filed Dec. 21, 1929

INVENTOR.
EARL J. W. RAGSDALE.
BY
ATTORNEY.

Patented Mar. 29, 1932

1,851,211

UNITED STATES PATENT OFFICE

EARL J. W. RAGSDALE, OF NORRISTOWN, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

AIRCRAFT STRUCTURE AND METHOD OF MAKING SAME

Application filed December 21, 1929. Serial No. 415,661.

The monocoque fuselage construction of my invention comprises in combination transverse frame members in the form of transverse bulkheads or the like, a longitudinally extending framing comprised of longitudinally extending paneling in a peripheral series of sections having overlapping margins, which overlapping margins are transversely offset relatively to each other intermediate the edges of the margins and secured together in the margins, whereby a longitudinally extending box cross section is formed between the overlapped panels, together with means securing such box cross section to the transverse frame members. While my invention may take any one of a multiple of forms, that which I shall describe and which is at present preferred by me has the main body of each longitudinally extending panel smooth in form, the offsetting being confined to the overlapped portions of adjoining panels. Furthermore, the offset is in the inner panel only, and the panels are secured to the transverse frame member through the bottoms of the offset, and by the offsets spaced in their main bodies from the transverse frame members. Thereby there is produced an exterior monocoque surface of a smooth surface free from corrugations. Further, the combination of the smooth surface with the box sectioned inward offsets forms transversely inwardly presenting channel cross sections of the paneling alternating with the box cross section. Yet further, I constitute the transverse frame members of Z cross section and spot weld the parts together, the bottoms of the offsets to the outer arm of the Z cross section of the transverse frame member, and the edges of the overlapped sections to each other.

Both this specific embodiment and another are shown in the three figures of the drawings of which—

Figure 1:
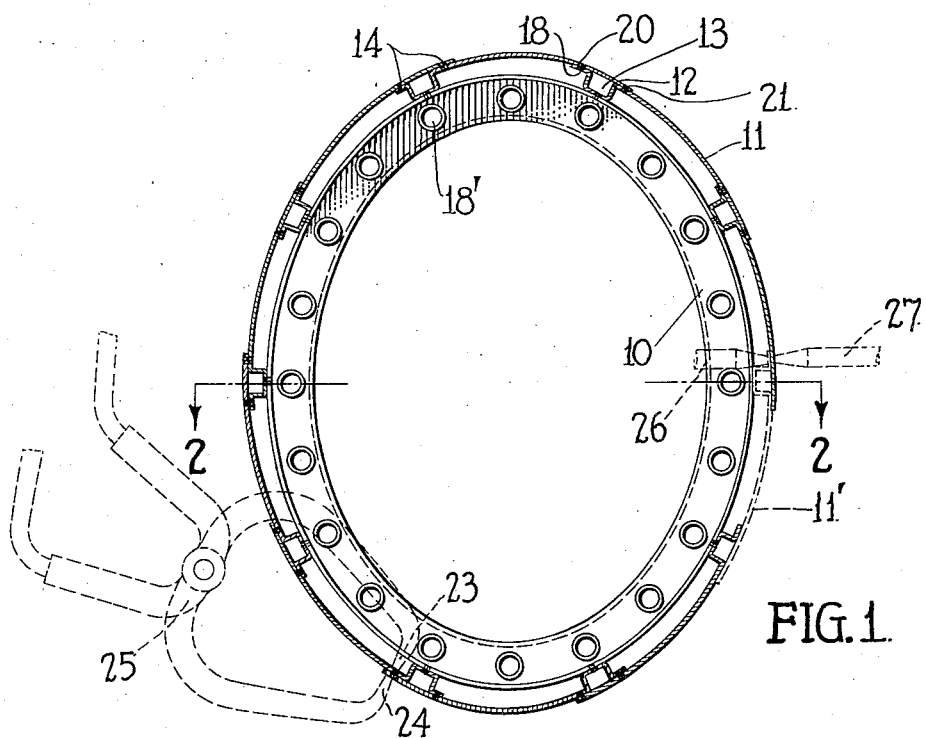
Figure 1 is a transverse cross section of such a monocoque fuselage.

Bound up in the construction of my invention is also its method. That method consists in successively outwardly overlapping the succeeding upon the preceding of a perimetral series of relatively narrow longitudinally extending panels, and spot welding them together progressively as they are successively so overlapped. The method further comprises the employment of such panels of relatively narrow width, spot welding them together and to the transverse frame members progressively as they are successively applied by opposed welding electrodes commonly operated from one side of the panel, inside or outside, until the final panel of the series is applied, and thereupon spot welding the final panel in place by opposed electrodes independently operated.

Throughout the figures the transverse frame members are designated 10, the main bodies of the panels 11, the overlapped portions of the panels 12, the longitudinally extending offsets of the overlapped portions 13, the edges of the overlap in which they are secured together 14.

Figure 2:
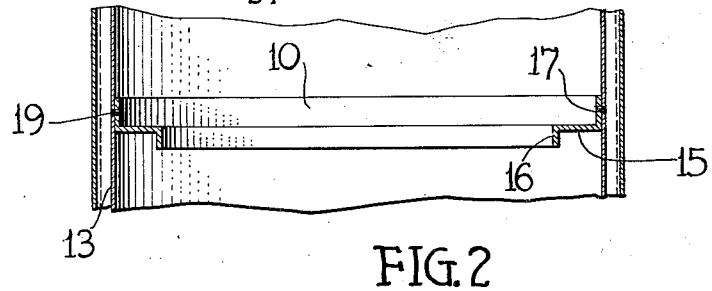
Figure 2 is a partial longitudinal cross section on line 2—2 of Fig. 1.

The Z cross section of the transverse frame member 10 appears very clearly in Fig. 2. It comprises a main body 15 and longitudinally extending arms 16 and 17. Such a section is not only very readily fabricated in ring form by a single die stamping operation, but by reason of the oppositely extending arms 16 and 17 possesses a maximum accessibility to spot welding electrodes as applied to secure the panels 11 to the outer arm 17. The ring may be lightened in well known manners as for example, by punching holes 18 in its main body.

The main bodies of the panels 11 are smooth in the form shown though they may be otherwise constituted if desired. The offsets 13 in their margins are of channel cross section presenting outwardly of the body and the outer wall of the channel is provided with a flange 18 in general extension of the curvature of the main body 11. The panels 11 are spot welded to the transverse frame members 10 by spot welding the bottoms of the offsets 13 to the outer peripherally extending arms 17 of the Z cross section of the transverse frame member as indicated in the figures at 19.

In the form shown, only one margin of the panel members 11 is provided with the offset 13. The other margin is of smooth curvature as is the main body. The smooth margins of the succeeding panel, considering their application counter-clockwise in the section of Fig. 1, is overlapped in each case upon the offset margin of the preceding panel and secured thereto in the edges 20 of the overlap by the spot welding indicated. Thus, the smooth main bodies 11 are secured to each other in the overlapped portions and through the offsets 13 secured to and radially spaced from the transverse frame member 10. Thus, through the offset between the edges of the overlapped portion 12, the overlapped portions are constituted longitudinally extending frame elements of box cross section integrally secured to the transverse frame members on the one hand and to each other on the other hand. Thus, considering the cross section of the longitudinally extending panels 11 from one offset 13 to the next adjacent, the offsets 13 with the smooth main body of the panel 11 constitue a channel cross section having a transversely curvilinear bottom wall presenting inwardly of the body and co-acting with the box cross section afforded by the offset in the overlapped portions 12 to give the body strength in every direction desired.

Figure 3:
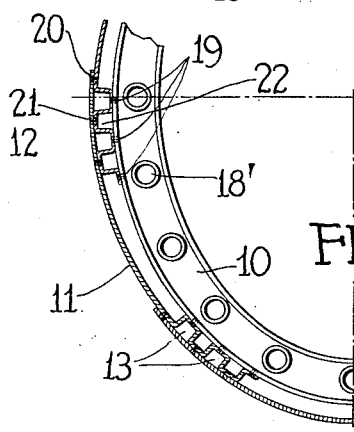
Figure 3 is a quarter of a transverse cross section of a modification.

In the modification of Fig. 3 a plurality of offsets 13 are provided intermediate the edges 20 of the overlapped portions 12 and the panels are not only secured to the transverse frame member 10 by welding 19 at the bottom of each offset, but they are also secured to each other both at the edges 20 and along lines 21 intermediate the offsets, the lines 21 lying in general continuation of the smooth surface of the main body of panels 11, thereby are afforded a plurality of box cross sections at the offsets 13 and intervening inwardly presenting channels 22 multiplying in groups the longitudinally extending reinforcing elements constituted by the offsetting in the region of the overlapped portions 12.

According to the method of my invention, I apply the panels to the transversely extending members in a peripheral succession of adjoining panels in a given direction, counter-clockwise as shown in Fig. 1. The first panel to be applied is secured to the transverse frame member 10 by spot welding to the bottom of the offset 13 in proper location, so secured to each transverse frame member 10 of the particular length of the body being constructed. The next adjoining panel is first overlapped by its portion 12 upon the overlapped portion of the panel first secured in place, and spot welded thereto through its edges 14 as at 20. Thereupon, the offset 13 and the overlapped portion 12 of this succeeding panel is spot welded by its bottom to the member 10 and so on with the third, fourth and other panels in order of peripheral succession. This spot welding is done by standard welding apparatus, the opposed electrodes 23 and 24 of which are commonly operated from the outside of the body through the intermediate framework and mechanism indicated diagrammatically by the framework 25. The panels are purposely chosen relatively narrow so as to be in reach of the arms of this framework 25 inside and outside, the arms being long enough by reason of the relatively narrow panels to reach inwardly and backwardly (clockwise in the present instance) from the offset margin of the succeeding panel to the offset margin of the preceding panel thereby to weld the overlapped portions 12 to each other in their edges 14. The final panel 11, however, which for the purpose of differentiation, is indicated in dotted lines in Fig. 1, is not so secured in place but is, on the other hand, secured in place by a welding apparatus embodying inside and outside electrodes 26 and 27 operated independently of each other, the one 26 from the inside of the body and the other 27 from the outside of the body. Accessibility for welding by standard machinery is thereby maintained around the entire periphery of the paneling until the very last panel is applied, closing the periphery against accessibility from one side only and thereupon independently operated electrodes are employed.

There results from the construction and the method a monocoque body of great symmetry and smoothness, of great strength, of a minimum number of parts, of a minimum number of assembly operations, of essential lightness, of adaptation to production in high alloy-non-magnetic steels peculiarly susceptible to spot welding, a perfect body spot welded together throughout, and at the same time of extremely low labor cost.

The apparent simplicity of my invention, as the modification of Figure 3 proves, is no bar to embodiment in different forms. The prior art rather than present known modifications and the circumstantial terminology of the annexed claims should determine the purview of my invention.

What I claim as new and useful and desire to protect by Letters Patent is:

1. A monocoque aircraft body comprising a transverse frame member and longitudinal combined paneling and framing comprised of longitudinally extending paneling smooth in its main body but inwardly offset in one of its longitudinally extending margins and having its main body spaced from and secured to the transverse frame member solely by said offset.

2. A monocoque aircraft body comprising a transverse frame member and longitudinal combined paneling and framing comprised of longitudinally extending paneling smooth in its main body but inwardly offset in one of its longitudinally extending margins and secured by spot welding through the bottom of the offset to the transverse frame member, the inward offset forming the sole spacing means between the main body of the paneling and the transverse frame member, together with an adjoining paneling of similar character overlapping outwardly by its smooth main body the outward offset of the first named paneling and secured thereto by spot welding on opposite sides of the inward offset thereof, whereby there is constituted in the offset a longitudinally extending frame element of box cross section.

3. A monocoque fuselage comprising longitudinally extending adjoining body panels overlapped in their longitudinally extending margins and transversely offset within the edges of the overlap at a multiple number of spaced points and secured together longitudinally at said points and in the edges of the overlapped portions whereby there are constituted in the overlap a multiple number of parallelly extending longitudinal frame elements of box cross section.

4. A monocoque aircraft body comprising longitudinally extending monocoque panels overlapped in their adjoining longitudinally extending margins and transversely relatively spaced apart between the opposite edges of the overlap and secured together in the said edges to constitute in the overlap a box sectioned longitudinally extending frame element, together with transverse frame members to which the paneling is secured solely by way of the bottoms of the offsets.

5. The method of constructing monocoque aircraft bodies comprising the successive application to the transverse framing of longitudinal members adapted to form combined framing and paneling and each comprised of smooth paneling in their main bodies and inwardly offset adjacent one margin, which consists in first securing a longitudinal member to a transverse frame member through the bottom of the offset adjacent one margin, then bringing the smooth margin of the next adjacent member in overlapping relation with the offset margin of the first-named member and securing the overlaps together on opposite sides of the offset.

In testimony whereof he hereunto affixes his signature.

EARL J. W. RAGSDALE.